United States Patent [19]

Swars

[11] Patent Number: 4,949,683

[45] Date of Patent: Aug. 21, 1990

[54] TUBULAR CAMSHAFT WITH LUBRICANT PASSAGES

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 306,034

[22] Filed: Feb. 2, 1989

[30] Foreign Application Priority Data

Feb. 7, 1988 [DE] Fed. Rep. of Germany ....... 3803685

[51] Int. Cl.$^5$ .............................................. F01M 9/10
[52] U.S. Cl. .................................... 123/90.34; 74/567
[58] Field of Search .......................... 123/90.34, 90.31; 184/6.9; 74/567

[56] References Cited

U.S. PATENT DOCUMENTS

| | | | |
|---|---|---|---|
| 2,202,330 | 5/1940 | Brock et al. | 74/567 |
| 3,628,513 | 12/1971 | Grosseau | 123/90.34 |
| 4,072,448 | 2/1978 | Loyd, Jr. | 123/90.34 |
| 4,644,912 | 2/1987 | Umeha et al. | 74/567 |

FOREIGN PATENT DOCUMENTS

| | | | |
|---|---|---|---|
| 3501433 | 8/1985 | Fed. Rep. of Germany . | |
| 8800643 | 1/1988 | Int'l Pat. Institute | 74/567 |
| 55-37552 | 3/1980 | Japan | 123/90.34 |
| 57-43051 | 3/1982 | Japan | 74/567 |
| 60-83731 | 5/1985 | Japan | 74/567 |
| 61-a2970 | 1/1986 | Japan | 74/567 |
| 62-147166 | 7/1987 | Japan | 74/567 |
| 2156485 | 10/1985 | United Kingdom . | |

Primary Examiner—Charles J. Myhre
Assistant Examiner—Weilun Lo
Attorney, Agent, or Firm—Toren, McGeady & Associates

[57] ABSTRACT

A camshaft comprises a hollow tubular shaft (1) and an inner member (10) which may be in the form of a tube. The inner member is inserted within the tubular shaft so that a lubricant guiding space is defined between the tubular shaft and the inner member. The lubricant guiding space is connectable via radial bores (8 and 9). The inner member (10) is in supporting contact with the tubular shaft (1) in portions (11, 12, 13, 19) thereof.

12 Claims, 1 Drawing Sheet

TUBULAR CAMSHAFT WITH LUBRICANT PASSAGES

BACKGROUND TO THE INVENTION

1. Field of the Invention

This invention is concerned with a camshaft comprising a hollow tubular shaft and an inner member received within the tubular shaft so that a lubricant guiding space is defined between the tubular shaft and the inner member and is connectable via radial bores in the tubular shaft to bearing regions on the outside of the tubular shaft and to at least one lubricant supply. Such a camshaft is known from West German patent specification No. 35 01 433 in which the inner member is in the form of a tube and, in addition to said bores, further radial bores are provided leading to the cam tracks. Camshafts of this type take account of the problem that in hollow camshafts there is not sufficient material for introducing oil guiding bores and that the entire cross-section of the hollow shaft should not be used for lubricant guiding purposes because this would result in unacceptable delays in the supply of oil especially when starting the engine when the oil supply cross-sections are empty.

2. Description of Prior Art

The camshaft described in the above-mentioned West German patent specification is used in the form of a plastic cylindrical tube or bar member which is produced by an injection molding process and engages in plugs or covers at the ends of the hollow camshaft. If the camshaft is long, it is necessary to provide additional spacers along the length of the camshaft. The production methods involved in achieving this are complicated since the spacers can only be produced by means of special molds inserted into the hollow shaft tube, these moulds being expensive and only being justified for large production runs.

It is an object of the present invention to develop a camshaft of the type aforementioned in which spacers and plugs at the ends of the shaft may be eliminated, even in the case of long camshafts, and to provide the possibility of reducing the cross-sections of the lubricant supplies.

SUMMARY OF THE INVENTION

The invention provides a camshaft comprising a hollow tubular shaft and an inner member received within the tubular shaft so that a lubricant guiding space is defined between the tubular shaft and the inner member and is connectable via radial bores in the tubular shaft to bearing regions on the outside of the tubular shaft and to at least one lubricant supply, wherein portions of the inner member are in supporting contact with the tubular shaft.

In a camshaft according to the last preceding paragraph, the use of additional spacers is dispensed with since their function is carried out by the inner member. The inner member can support the tubular shaft either in regions spaced axially along the tubular shaft or in longitudinally-extending regions arranged around the circumference of the tubular shaft. Furthermore, the inner member regions which are subject to free bending vibrations are shortened or eliminated. In addition, it is possible to design the regions of contact with the tubular shaft at the ends in such a way that there is no need for additional covers, with the inner member itself completely closing the cross-section of the tubular shaft.

Preferably, the inner member is in the form of a tube and at least some of said portions are established by expansions of the cross-section of the inner member. This arrangement can conveniently provide the contact with the tubular shaft at end portions of the camshaft. However, this does not mean that the cross-sectional expansions have to be restricted to the end portions as such cross-sectional expansion with a circular cross-section may be provided in several places along the entire length of the camshaft, if several lubricant supplies permit the simultaneous supply of all the bearing regions. Between the cross-sectional expansions of the inner member, the inner member may be designed to be completely gap-free relative to the tubular shaft, while also having a circular cross-section. The regions subject to vibrations are thus shortened. In an advantageous embodiment of the invention, either the entire inner member or certain longitudinal portions thereof are provided with a non-circular cross-section which may be approximately clover-leaf-shaped and which, while forming individual axial longitudinal channels, contacts the circumference of the tubular shaft in three or four places. The open longitudinal channels have to be aligned in such a way that there is free communication with the radial bores.

The non-circular cross-sectional shape aforementioned may extend along the whole length or may just be provided on certain portions between which the inner member has a completely circular cross-section. In these regions of circular cross-section, there may either be provided a radial distance relative to the tubular shaft resulting in an annular lubricant channel, or the shaft cross-section may change into a circular cross-section which corresponds to the inner aperture of the tubular shaft, thereby cutting off the free flow, especially at the ends of the camshaft.

The non-circular cross-sectional shape is readily produced by rolling the individual grooves into the inner member in the longitudinal direction, for example if the starting material is a steel plate tube. However, it is also possible to use a continuously cast aluminium section or a plastic injection molded part.

In the regions where support is provided, the inner member does not necessarily have to be in direct contact with the tubular shaft, the contact may alternatively be provided by a solid sleeve which is inserted into the tubular shaft and which itself may carry a driving pinion at the end of the tubular shaft. Such a construction takes advantage of the basic principle of the invention. In order to generate additional strength in the regions of contact, particularly in those areas where there is contact around the entire circumference of the tubular shaft, where the inner member is in the form of a tube, it is possible to press a ball which is overdimensioned relative to the inner diameter of the inner member into the inner member so that the ball makes a clamping fit with the inner member. A spiral spring may serve the same purpose, the spring in its untensioned condition being overdimensioned relative to the inner diameter of the tubular inner member and would be pressed into the inner member.

Other methods of clamping, including pressing the inner member into grooves or recesses of the tubular shaft in a form-fitting way are also possible, with suitable plugs or covers being used, especially at the end regions of the camshaft.

BRIEF DESCRIPTION OF THE DRAWINGS

A preferred embodiment of the invention is described in detail with reference to the accompanying drawings, in which.

DESCRIPTION OF PREFERRED EMBODIMENTS

Figure 1:
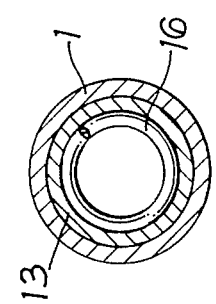
FIG. 1 is a cross-sectional view taken on the line I—I in FIG. 4.

The camshaft shown in the drawings comprises a tubular shaft 1 with a uniform diameter along its length and driving elements in the form of cams 2 attached to it. A sleeve 4 is inserted into the tubular shaft 1 at one end thereof and is connected to a flange disc 3, forming a driving element, so as to be integral with the disc 3. The connection between the shaft 1 and the cams 2 is formed by a force-locking process involving an hydraulic expansion of the tubular shaft 1. The tubular shaft 1 and the sleeve 4 are also connected in a force-locking way which is also affected by a hydraulic expansion of the sleeve 4 relative to the tubular shaft 1. The flange 3 is provided with circumferentially distributed connecting bores 5 and a central aperture 6 in which an internal thread or grooves 7 have been provided which extend circumferentially around the aperture 6. The tubular shaft 1 also comprises radial lubricant supply bores 8 and radial lubricating bores 9 in the bearing regions of the camshaft. The bores 8 and 9 in the region of the sleeve 4 also pass through the sleeve.

Figure 3:
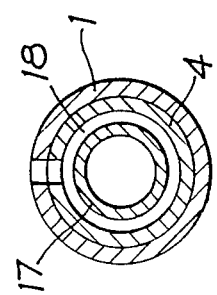
FIG. 3 is a cross-sectional view taken on the line III—III in FIG. 4.
Figure 4:
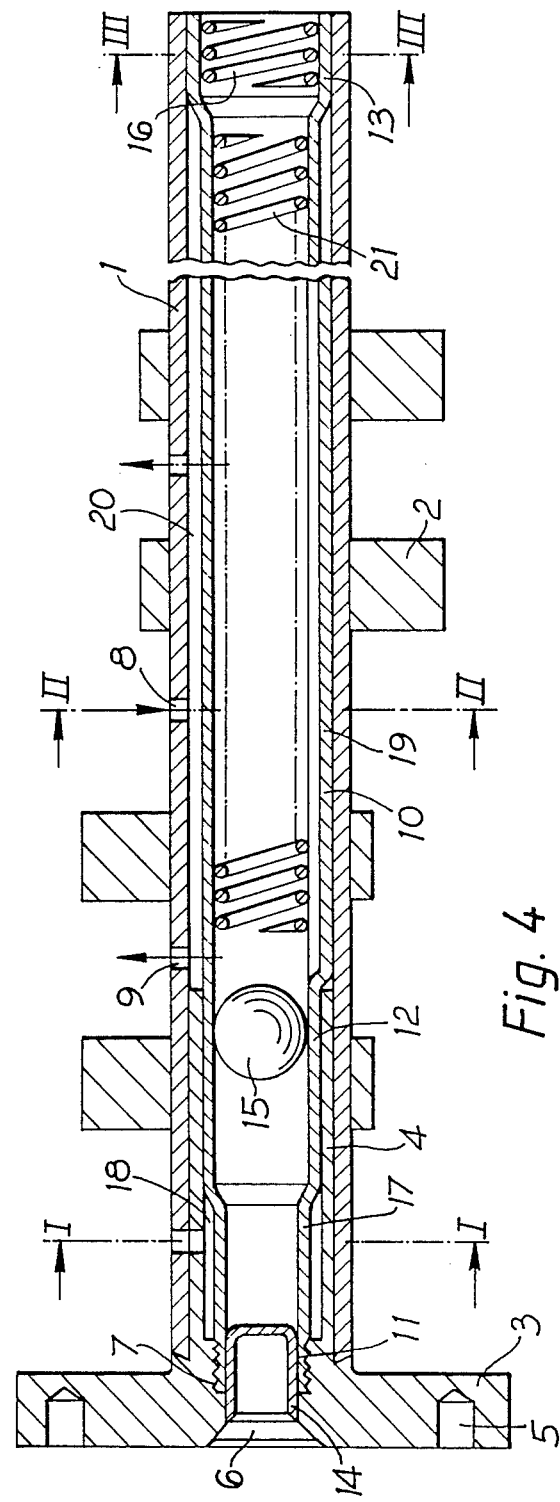
FIG. 4 is a longitudinal cross-section view taken on the line IV—IV in FIG. 2 through a camshaft according to the invention.

The camshaft shown in the drawings also comprises an inner member 10 which is in the form of a tube and is inserted into the tubular shaft 1. The inner member 10 has different cross-sectional shapes in certain portions thereof but is in supporting contact with the tubular shaft 1 in certain of those portions. Viewing FIG. 4, the inner member 10 has been provided with three longitudinally-spaced portions 11, 12 and 13 at which the inner member 10 has a circular cross-section and with which, around the entire circumference, there is sealing contact with the tubular shaft 1 or the sleeve 4. Furthermore, in the portion 11, there is a sleeve 14 pressed into the inner member 10 to form a form-fitting engagement between the portion 11 and the circumferential grooves 7 of the flange 3. In the portion 12 of circular cross-section, a ball 15 has been pressed into the inner member 10 thereby increasing the pressure between the inner member 10 and the tubular shaft 1 at least along one circumferential line in order to ensure that leakage of oil across this circumferential line is not permitted. As can be seen in FIG. 3 and FIG. 4, a spiral spring 16 is inserted into the portion 13 of the inner member 10, the spiral spring 16 being overdimensioned relative to the internal dimension of the inner member 10 and contacting the inner wall of the inner member 10. The spring 16 serves the same function as the ball 15 in portion 12, but along its entire length. In this case also, sealing between the outside of the inner member 10 and the inside of the tubular shaft 1 is improved with regard to oil leakage.

As can be seen in FIG. 1, between the portion 11 of the inner member 10 supported in the flange aperture 6 and the portion 12 thereof supported in the sleeve 4, there has been provided a portion 17 with a circular cross-section which is positioned at a radial distance from the sleeve 4 and provides an annular cylindrical oil supply space 18. The space 18 is connected to grooves (not shown) extending longitudinally in the inner member 10 or the sleeve 4. The portion 17 illustrates that the inner member 10 does not necessarily have to be in supporting contact with the tubular shaft 1 along its entire length but that intermediate axial regions may be support-free.

Figure 2:
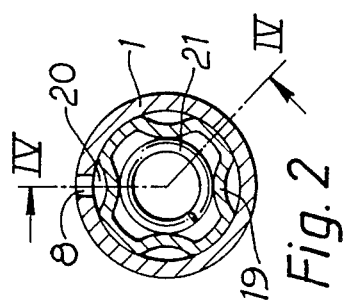
FIG. 2 is a cross-sectional view taken on the line II—II in FIG. 4.

As shown in FIG. 2, between the portions 11 and 13 of the inner member 10 which have a circular cross-section and are in complete contact with the tubular shaft 1, there is provided a portion 19 of the inner member 10 which has a non-circular cross-section and which while having an approximately clover-leaf-like circumferential shape, contacts the tubular shaft 1 in four circumferentially spaced regions. The portion 19 could also be regarded as being fluted. By this design, individual longitudinally-extending oil grooves 20 are provided, of which at least one must be in open connection with the oil supply and lubricating bores 8 and 9. A spiral spring 21 with a diameter in its untensioned condition oversized relative to the minimum diameter of the portion 19 is inserted into the portion 19 and presses the circumferentially deformed portion 19 outwardly. The portion 19 illustrates that the partial direct contact between the inner member and the tubular shaft does not have to be distributed symmetrically around the entire circumference. On the contrary, the basic principle of the invention permits deformations in the form of longitudinal grooves in the inner member 10. Between the individual longitudinal portions of the inner member 10 there may be provided a transverse wall for stabilising purposes which is readily produced if the inner member 10 is made by injection moulding a plastic part. If the inner member 10 is made from a steel plate tube, the longitudinal grooves 20 may simply be rolled in, with the cross-section reducing portions being produced by elongation, in this case, preferably the single-part transverse wall can be provided by an inserted plug.

I claim:

1. A cam shaft comprising a hollow tubular shaft and an inner member received within the tubular shaft so that a lubricant guiding space is defined between the tubular shaft and the inner member and is connectable via radial bores in the tubular shaft to bearing regions on the outside of the tubular shaft and to at least one lubricant supply, wherein portions of the inner member are in supporting contact with the tubular shaft, the inner member having a circular cross-section in at least some of said portions which are in supporting contact with the tubular shaft.

2. A can shaft comprising a hollow tubular shaft and an inner member received within the tubular shaft so that a lubricant guiding space is defined between the tubular shaft and the inner member and is connectable via radial bores in the tubular shaft to bearing regions on the outside of the tubular shaft and to at least one lubricant supply, wherein portions of the inner member are in supporting contact with the tubular shaft, the inner member having at least one end portion of reduced cross-section which contacts the tubular shaft or a sleeve inserted into the tubular shaft.

3. A camshaft comprising a hollow tubular shaft and an inner member received within the tubular shaft so that a lubricant guiding space is defined between the tubular shaft and the inner member and is connectable via radial bores in the tubular shaft to bearing regions on the outside of the tubular shaft and to at least one lubricant supply, wherein portions of the inner member are in supporting contact with the tubular shaft, the inner member being in the form of a tube and at least some of said portions being established by expansions of the cross-section of the inner member.

4. A shaft according to claim 3, wherein the inner member is made of aluminium.

5. A shaft according to claim 3, wherein the inner member has between circular end portions a central longitudinal portion which is of non-circular cross-section and which makes contact with the tubular shaft.

6. A shaft according to claim 5, wherein the central longitudinal section of the inner member has cross-section in the shape of the outline of a clover leaf and forms with the tubular shaft longitudinal channels which communicate with the radial bores.

7. A shaft according to claim 3, wherein the inner member has portions of circular cross-section and at least one portion of non-circular cross-section.

8. A shaft according to claim 3, wherein the inner member is in the form of a tube into which is inserted a ball which makes a clamping fit with the inner member in a region of supporting contact between the inner member and the tubular shaft.

9. A shaft according to claim 3, wherein the inner member is in the form of a tube into which is inserted at least one spiral spring which makes a clamping fit with the inner member in a region of supporting contact between the inner member and the tubular shaft.

10. A shaft according to claim 3, wherein the inner member is in the form of a tube and a plug pressed into the tube deforms the tube to produce a form-fitting engagement between the tube and recesses in the tubular shaft or a sleeve inserted into it.

11. A shaft according to claim 3, wherein the inner member is in the form of a tube made of a plastically deformable material.

12. A shaft according to claim 11, wherein the plastically deformable material is steel plate.

* * * * *